Patented July 25, 1933

1,919,517

UNITED STATES PATENT OFFICE

KOJI KONISHI, OF KYOBASHI-KU, TOKYO, AND SEISUKE KODAMA, OF SUGINAMI-MACHI, TOYOTAMA-GUN, TOKYO-FU, JAPAN; SAID KODAMA ASSIGNOR TO SAID KONISHI

PROCESS FOR PROVIDING A TRANSPARENT COATING ON GLASS SURFACES

No Drawing. Application filed December 10, 1930, Serial No. 501,466, and in Japan June 19, 1930.

This invention relates to a process for coating the outer surface of articles of glass, especially thin glass articles, for instance such as watch glasses and the like. This coating is, of course, transparent, and its object is to hold, in the case of a glass article provided with this coating getting broken, the glass particles together so that, for instance in the case of the respective article being a watch glass, the fragments cannot get access to the wheelwork of the watch and damage and stop it. The coating prepared according to this process is elastic or flexible so that it is able to give to a certain degree, that is to say, even in the case of, for instance, a watch glass getting broken and the pieces loosening a little from the former proper position they have had in the unbroken glass, they will be held together, in that the coating is able to follow the slight changes of the position of the fragments without being torn. But in spite of that flexibility or yieldingness the coating is very strong and resistive and no rents or the like will form it in the course of time. It remains fully intact for any time to come, also fully transparent, and in these and other respects it excels the other transparent coatings which have become known up to now. Especially its adherence to the glass is extraordinarily strong.

In preparing our improved coating we dissolve cellulose acetate in a slowly drying solvent, dilute the solution with a liquid selected from the group consisting of acetone, benzole, and benzin-alcohol, and add then preferably an organic alkali selected from the group of urea and pyridine, whereafter the respective glass article is coated with that composition and the coated article is subjected to the action of benzol vapor in a closed chamber. If an organic alkali is used, a comparatively small quantity thereof will generally suffice. Exposing the coated glass articles to the benzol vapor is generally effected at ordinary temperature, so that the composition is not decomposed and the coating or film is completely prevented from getting rents or the like; also no plaits or bubbles arise. The film is and remains completely smooth and its transparency is not in the least impaired.

We are giving here an example: 600 grams of acetone are mixed with 300 grams of benzol, 300 grams of alcohol, 60 grams of methyl-hexaline, from 10 to 30 grams of triphenyl-phosphate, and, finally, 100 grams of cellulose acetate are added. If also an organic alkali, as for instance one of the group consisting of urea and pyridine, is added, its amount should not exceed 10 grams. We wish it, however, to be understood that making use also of the one or the other of these latter substances is not indispensably requisite. When the composition has thus been prepared, the respective glass surfaces are coated therewith so as to receive a film and finally they are subjected to the action of benzol vapor, as already stated. Owing to the employment of the substances mentioned a resin or resins, as used in the known transparent coatings, can be completely dispensed with so that the finished coatings or films are free from the resinous touch constituting a disagreeable peculiarity of the known coatings or films.

We claim:

1. A process for providing a transparent coating or film upon glass surfaces, comprising dissolving cellulose acetate in a slowly drying solvent, diluting the solution with a liquid selected from the group consisting of acetone, benzol, and benzin-alcohol, coating the respective glass article with said composition, and subjecting the coated articles to the action of benzol vapor, substantially as set forth.

2. A process for providing a transparent coating or film upon glass surfaces, comprising dissolving cellulose acetate in a slowly drying solvent, diluting the solution with a liquid selected from the group consisting of acetone, benzol, and benzin-alcohol, adding an organic alkali selected from the group consisting of urea and pyridine, coating the respective glass article with said composition, and subjecting the coated articles to the action of benzol vapor, substantially as set forth.

3. A process for providing a transparent coating or film upon glass surfaces, comprising mixing 600 grams of acetone, 300 grams of benzol, 300 grams of alcohol, 60 grams of methyl-hexaline, and form 10 to 30 grams of triphenyl-phosphate, coating the respective surfaces with this composition, and exposing the coated articles to the action of benzol vapor, substantially as set forth.

4. A process for providing a transparent coating or film upon glass surfaces, comprising mixing 600 grams of acetone, 300 grams of benzol, 300 grams of alcohol, 60 grams of methyl-hexaline, from 10 to 30 grams of triphenyl-phosphate, and up to 10 grams of an organic alkali selected from the group consisting of urea and pyridine, coating the respective surfaces with this composition, and exposing the coated articles to the action of benzol vapor, substantially as set forth.

KOJI KONISHI.
SEISUKE KODAMA.